United States Patent
Okazaki

(10) Patent No.: US 7,347,591 B2
(45) Date of Patent: Mar. 25, 2008

(54) REFLECTOR AND LIGHT SOURCE APPARATUS HAVING REFLECTOR

(75) Inventor: Yoshio Okazaki, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 218 days.

(21) Appl. No.: 10/977,994

(22) Filed: Oct. 28, 2004

(65) Prior Publication Data

US 2005/0094406 A1    May 5, 2005

(30) Foreign Application Priority Data

Oct. 29, 2003   (JP)   .............................. 2003-368884

(51) Int. Cl.
*G03B 15/02*   (2006.01)
(52) U.S. Cl. ...................................... 362/341; 362/296
(58) Field of Classification Search ................ 362/296, 362/341; 313/113
See application file for complete search history.

(56) References Cited

U.S. PATENT DOCUMENTS 6,957,900 B2 *   10/2005   Hirano et al. ............... 362/296

FOREIGN PATENT DOCUMENTS

JP   2000-82311 A   3/2000

* cited by examiner

*Primary Examiner*—Anabel Ton
(74) *Attorney, Agent, or Firm*—Jeffrey L. Thompson; Thompson & Thompson

(57) ABSTRACT

A reflector according to the present invention can certainly reflect light emitted from a lamp in a desired direction without producing distortion in a reflection surface by specifying the distance between a projection portion and a back side end portion of the reflection surface of a reflector to be in the optimal range. The reflector, having a front side opening portion, a back side opening portion and a reflection surface, the reflector comprises a projection portion provided in an inner surface of the reflector, wherein, the projection portion is formed in an area at a 2.5 mm or more distance from a back side end portion of the reflection surface toward a back side.

6 Claims, 4 Drawing Sheets

REFLECTOR AND LIGHT SOURCE APPARATUS HAVING REFLECTOR

FIELD OF THE INVENTION

The present invention relates to a reflector made of borosilicate glass, and a light source apparatus which is equipped with the reflector to which an extra-high pressure mercury lamp is attached.

DESCRIPTION OF THE RELATED ART

As a light source for a liquid crystal projector, a metal halide lamp which uses halide of a rare earth metal as a luminescence substance, and an extra-high pressure mercury lamp in which a lot of mercury which is used as a luminescence substance is enclosed so that the mercury vapor pressure at the time of lighting amounts to 150 or more atmospheric pressure, are known.

In recent years, since it is demanded that liquid crystal projectors be small and light so that they are totable, a liquid crystal panel for such a liquid crystal projector has been miniaturized. Therefore, much more miniaturization and higher intensity of a light source have been required in order to condense light to the miniaturized liquid crystal panel efficiently. For this reason, in recent years, the extra-high pressure mercury lamp has been used among the above-mentioned lamps as a light source.

In order to efficiently converge light emitted from the lamp to a light exposed surface which has a fixed area, such an extra-high pressure mercury lamp (hereinafter merely referred to as a lamp), having a bowl-shaped reflector, with a large solid angle, for receiving light is used.

Conventionally, in a reflector for an extra-high pressure mercury lamp which is manufactured by press molding with a die, a specular surface shape can be precisely formed, wherein borosilicate glass which is advantageous in terms of the cost, is used as material therefore. For example, refer to Japanese Laid Open Patent No. 2000-82311.

Hereafter, a manufacture method of the reflector for the conventional extra-high pressure mercury lamps is explained, referring to FIG. 7.

FIGS. 7A and 7B are diagrams for explaining the manufacturing method of the reflector for the conventional extra-high pressure mercury lamps.

FIG. 7A is a diagram for explaining a first process.

FIG. 7B is a diagram for explaining a second process.

First Process

As shown in FIG. 7A, a female mold 1 has a concave portion which is suited for the shape of a reflector to be cast, and has a hole 3 for a neck portion for forming the neck portion of the reflector in the bottom of the concave portion. Melted Glass 4 is put in this female mold 1, and pushed therein by a male mold 2 from the upper side, putting pressure on it. This male mold 2 is slightly smaller than the concave portion of the female mold 1, and the shaped reflector 6' is formed in the gap created when the male mold is pushed in the female mold 2. The depression of the male mold 2 is performed almost momentarily, and the male mold 2 is raised after that. In addition, in FIG. 7A, the male mold 2 in the state where it is depressed, is shown for convenience of explanation. The shaped reflector 6' is cooled down naturally or by compulsive cooling, in this state. And the shaped reflector 6' is removed from the female mold 1 by a ring-like mold 19 in the state where it solidifies to some extent.

Second Process

The shaped reflector 6' cast in the first process is placed in an electric furnace which is kept at predetermined humidity, wherein cold removal (and/or cooldown) is carried out to approximately a room temperature by performing annealing treatment wherein temperature falls at a fixed speed. Then, as shown in FIG. 7B, a back side opening portion 12 for inserting a lamp is formed by performing cutting by tools, such as a drill etc., to a punch portion 5 provided in the shaped reflector 6'. In this case, an annular projection portion 50 is formed by punching the punch portion 5.

SUMMARY OF THE INVENTION

In consideration of such circumstances, it is an object of the present invention to provide a reflector capable of certainly reflecting light emitted from a lamp in a desired direction without producing distortion in a reflection surface thereof by specifying a distance between a projection portion and a back side end portion of the reflection surface of the reflector to be in the optimal range.

The object of the present invention is accomplished by a bowl-shaped reflector made of borosilicate glass, having a front side opening portion, a back side opening portion and a reflection surface that reflects light emitted from a lamp, and a neck portion in which the lamp is arranged, the reflector comprising an annular projection portion provided in an inner surface of the reflector, wherein, the annular projection portion is formed in an area at a 2.5 mm or more distance from a back side end portion of the reflection surface toward a back side.

Since the reflector has the structure in which the distance between the projection portion and the back side end portion is specified to be 2.5 mm or more, frame of a burner does not blow the surface of the projection portion formed on the back side opening portion of the reflector when the fire polishing treatment is carried out thereon. It is possible to reflect the light emitted from the lamp in the desired direction certainly, since distortion is not produced in a reflection surface.

The projection portion may be formed in an area at a 2.5 to 5 mm distance from the back side end portion of the reflector surface toward the back side. That is, since the reflector according to the present invention has the structure in which the distance between the projection portion and the back side end portion in the reflection surface is specified to be in the range from 2.5 mm to 5 mm (2.5 mm or more and 5 mm or less), when a lamp is built into the reflector, it is possible to sufficiently secure the diameter of the back side opening portion in view of the diameter of a mouth piece attached to the lamp, adjustment of the lamp position, and a cooling air passage.

Further, the thickness of the projection portion may be 1 to 2.5 mm. That is, since in the second above-mentioned process, the thickness of a portion to be punched is specified so that it is easy to form the back side opening portion for inserting the lamp, by a depressing member, the back side opening portion can be formed easily. Furthermore, since it possible to efficiently cool down the lamp by cooling air since it becomes possible to cool the sealing portion of the lamp evenly and uniformly since the cooling air flows in whirls around the projection portion formed on the back side opening portion of the reflector when the reflector is built in the a lamp.

Further, the object of the present invention is accomplished by a light source apparatus, wherein an extra high pressure mercury lamp is provided in the above-mentioned reflector. Furthermore, since the reflector according to the present invention is built in a light source apparatus, cracks does not arise in the reflector at the time of lighting of the lamp, and the lamp is easily built in the reflector, and furthermore, it is possible to cool down the lamp efficiently.

BRIEF DESCRIPTION OF THE DRAWINGS

FIG. 7A is a diagram for explaining a first process. FIG. 7B is a diagram for explaining a second process.

DESCRIPTION OF THE PREFERRED EMBODIMENTS

Figure 1A:
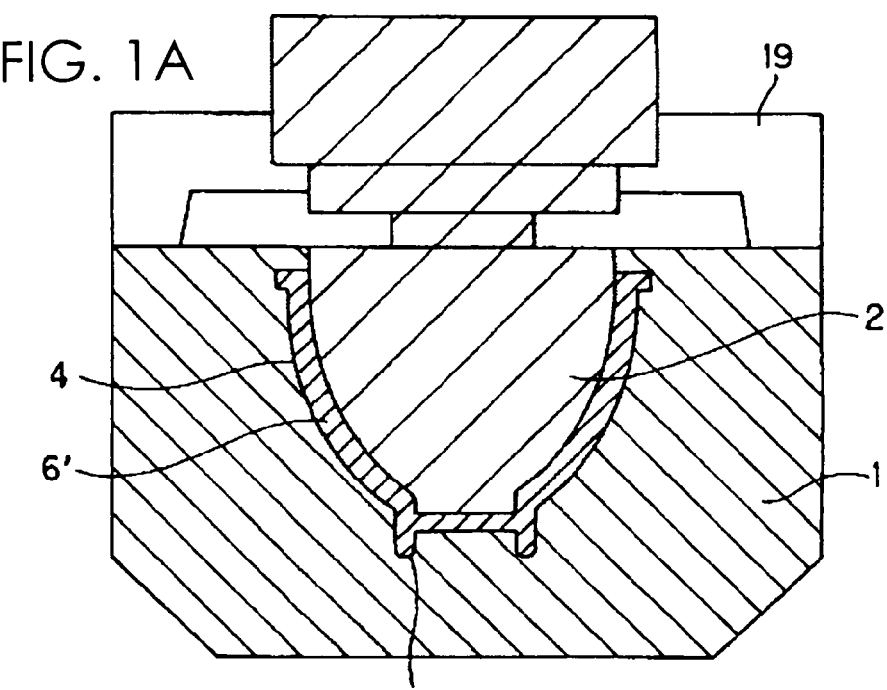
FIGS. 1A, 1B, and 1C are diagrams for explaining a manufacturing method of the reflector according to the present invention.
Figure 1B:
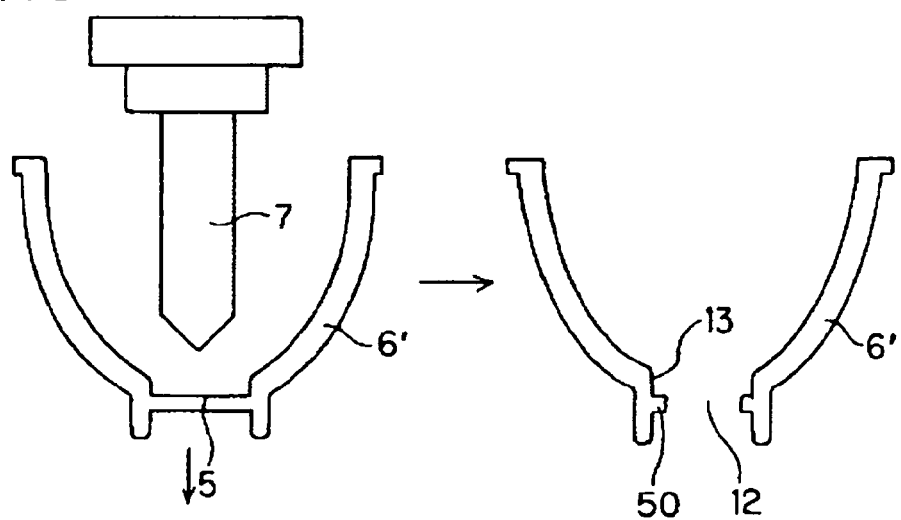
Figure 1C:
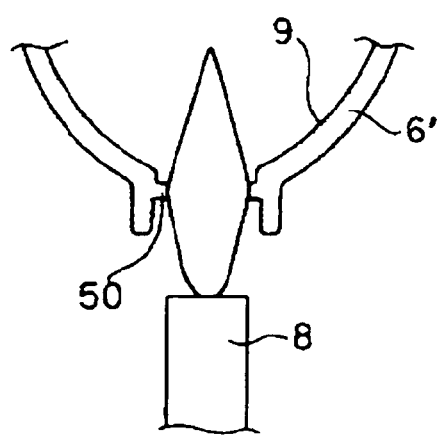

FIGS. 1A, 1B, and 1C are diagrams for explaining a manufacturing method of the reflector according to the present invention.

As shown in FIGS. 1A, 1B and 1C, the reflector according to the present invention is manufactured by first and fourth processes.

First Process

As shown in FIG. 1A, the female mold 1 has a concave portion which corresponds to the shape of the reflector to be cast, and a hole for a neck portion 3 is provided to form the neck portion of the reflector in the bottom of the concave portion.

Melted borosilicate glass 4 is put in the female mold 1, and pushed therein by the male mold 2 from the upper side, putting pressure on it. This male mold 2 is slightly smaller than the concave portion of the female mold 1 a little, and the shaped reflector 6' is formed in the gap created when the male mold is pushed in the female mold 2. The depression of the male mold 2 is performed almost momentarily, and the male mold 2 is raised after that. And the shaped reflector 6' is removed from the female mold 1 by a ring-like mold 19 immediately after the female mold is lifted.

Second Process

As shown in FIG. 1B, after bringing a depressing member 7 into contact with the punch portion 5 which has been formed in the shaped reflector 6' cast in the first process in order to form a back side opening portion in a later process, the back side opening portion 12 (not shown in FIG. 1B) is formed by pushing down the depressing member 7 (in a direction shown in an arrow in FIG. 1B). The operation of the second process is promptly carried out, after the reflector 6' is cast in the first process and before the temperature of the shaped reflector 6' falls. Thereby, the annular projection portion 50 is formed inside of the shaped reflector 6'.

Third Process

As shown in FIG. 1C, a fire polishing treatment is carried out for one (1) second with a burner 8 to the projection portion 50. The reason for performing such processing is based on the reasons set forth below.

Since much unevenness exists on the surface of the projection portion 50 immediately after forming a back side opening portion 12 in the second process, it is coarse in microscopic view. And in this state, when an incorporated lamp is lighted at a highly humid atmosphere in the reflector, cracks occur in the projection portion beginning at the projection portion 50. Therefore, it is necessary to change the surface of the projection portion 50 into a smooth state in microscopic view in order to prevent such cracks. Moreover, since the cracks are created due to local heating if fire polishing treatment to the shaped reflector 6' is carried out when temperature thereof falls, it is necessary to perform the fire polishing treatment promptly after the second process ends.

Fourth Process

After the third process ends, the shaped reflector 6' is placed and cooled down in an electric furnace which is maintained at predetermined concentration, by lowering the temperature of the electric furnace at a fixed rate. Such cooldown is performed in order to prevent cracks caused by rapid cooldown in case that the reflector is left under room temperature. What is manufactured by such first process to the fourth process is called a reflector.

Figure 2:
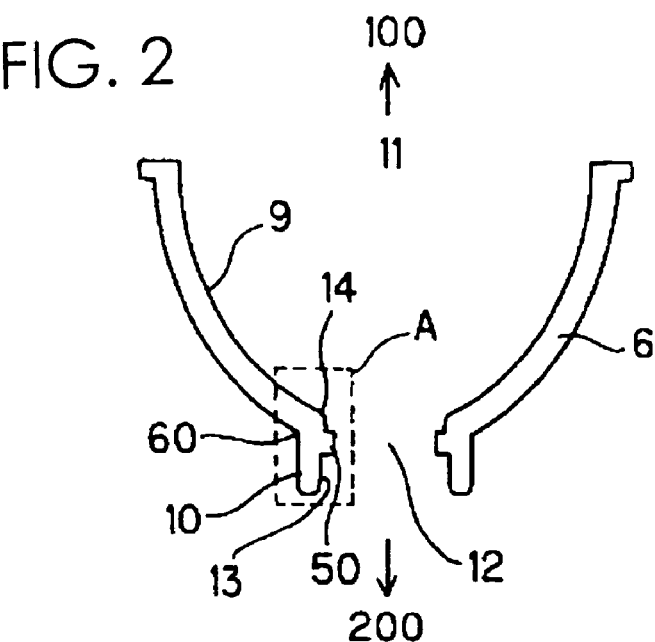
FIG. 2 is a cross sectional view of a reflector in a longitudinal direction according to the present invention.

FIG. 2 is a cross sectional view in a longitudinal direction for explaining the reflector according to the present invention.

In FIG. 2, the same reference numbers as those in FIG. 1 are assigned to the same portions as those shown in FIG. 1. The reflector 6 comprises the reflection surface 9 formed on the surface of the reflector 6, and the neck portion 10, for arranging a lamp, wherein a front side opening 11, and the back side opening portion 12 for inserting the lamp are provided. In addition, it is also possible to form, on the reflection surface, a multilayer film for reflecting visible light thereon, which is made from, for example, $SiO_2$ and $TiO_2$ films if needed. In the second above-mentioned process, the projection portion 50 which is formed when the punch portion 5 is punched in the second process by the depressing member 7 is formed on a non-reflection surface 13 in the inner surface of the reflector 6.

In addition, the front side means a side shown in an arrow 100, and the back side means a direction shown in an arrow 200 in the figure. Further, the reflection surface 9 means a surface on the front side of the reflector 6 which extends in the front side direction from the back side end portion 14, and the non-reflection surface 13 means a surface on the back side of the reflector 6 which extends in the back side direction from the back side end portion 14.

Furthermore, the neck portion 10 means a portion which extends from a base portion 60 of the reflector 6 in the back side direction, and the back side opening portion 12 means an entire opening portion which extends in the back side direction from the back side end portion 14 of the reflection surface.

Since the reflector according to the present invention is manufactured by the first through fourth processes, the surface roughness Ra (JISB0601 standard) of the projection portion 50 becomes less than 0.1. That is, since little unevenness exists on the surface of the projection portion 50, it is possible to prevent cracks beginning at the projection portion 50. Since the entire reflector of the present invention is heated uniformly since the fire polishing treatment in the third process is carried out to the surface of the projection portion 50 in a state where the temperature is sufficiently high.

Since as common glass characteristics, it is known that cracks are easily created due to temperature difference if local heating is carried out, it is desirable to uniformly heat the entire reflector according to the present invention.

Figure 3:
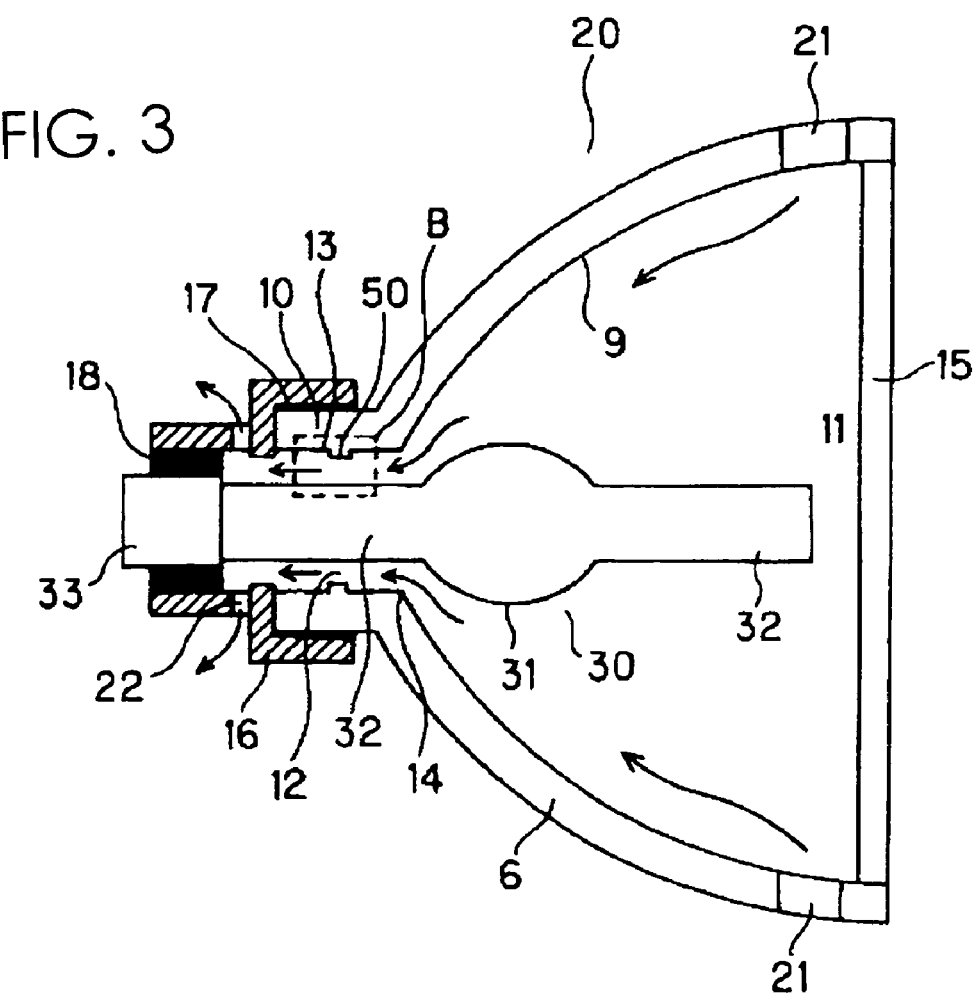
FIG. 3 is a cross sectional view of a light source apparatus wherein an extra-high pressure mercury lamp is built in the reflector according to the present invention.

FIG. 3 is a cross sectional view of a light source apparatus wherein an extra-high pressure mercury lamp is built in the reflector according to the present invention.

In FIG. 3, the same reference numbers as those in FIG. 1 are assigned to the same portions as those shown in FIG. 1.

While an optically transparent front glass plate 15 for preventing fragments from scattering just in case that the lamp is exploded is fitted in the front side opening portion 11 of the reflector 6, the reflector base 16 is fixed to the neck portion 10 by adhesives 17. The extra-high pressure mercury lamp 30 comprises a light emitting portion 31 and sealing portions 32 extending from both ends of the light emitting portion 31, wherein 0.15 mg/mm$^3$ or more of mercury is enclosed in the light emitting portion 31. The extra-high pressure mercury lamp 30 (hereinafter merely referred to as a lamp 30) is fixed by filling up with adhesive 18 between a reflector base 16 and a mouthpiece 33 which is disposed to one of sealing portions 32. The light source apparatus 20 means the structure in which the reflector base 16 is joined with the reflector 6, and the lamp 30 is incorporated therein.

Such a light source apparatus 20 has the structure in which the front glass plate 15 is fitted in the front side opening portion 11 of the reflector 6, and the temperature of the inside of the apparatus tends to be high at the time of the use. Especially, least one cooling air introducing inlet 21 for introducing cooling air for cooling the lamp 30 is formed in the reflector 6 near the front glass plate 15 in order to avoid the situation where a lamp is not lighted since feeding lines (not shown) which is laid under the sealing portions 32 melt when the temperature of the lamp 30 become high.

The cooling air introduced from the cooling air introducing inlet 21 flows in the longitudinal direction of the lamp 30, and the cooling air is discharged from a discharge outlet provided in the reflector base 16, after passing through the back side opening portion 12 provided in the reflector 6.

First, an embodiment of the present invention will be described below, referring to FIG. 4.

Figure 4:
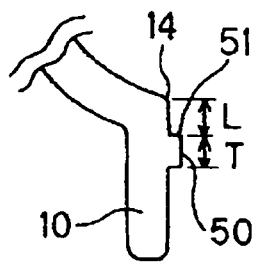
FIG. 4 is an enlarged view of part of the reflector shown in broken lines in FIG. 2.

FIG. 4 is an enlarged view of part of the reflector shown in broken lines in FIG. 2. In the reflector according to the present invention, the annular projection portion 50 is formed in an area at a 2.5 mm distance from the back side end portion of the reflection surface 9 toward the back side. In other words, the distance L between the projection portion 50 formed in the non-reflection surface 13 and the back side end portion 14 of the reflection surface 9 is set to 2.5 mm or more. When the fire polishing treatment is carried out to the surface of the projection portion 50 in order to eliminate cracks in a manufacturing stage, if the distance is less than 2.5 mm, there is possibility that distortion of the reflection surface 9 is caused so that light emitted from the lamp 30 cannot be reflected in a desired direction. Although it is possible to make flame not hit the reflection surface by adjusting the flame of a burner to a small level as a method for avoiding such a situation, the method is not desirable since it takes a long time to completely eliminate the unevenness on the surface of the projection portion 50. On the other hand, according to the present invention, the unevenness on the surface of the projection portion 50 can be eliminated without creating distortion in the reflection surface 9 so that the above-mentioned problem does not arise since there is enough distance between the projection portion 50 and the reflection surface 9. The numerical value, 2.5 mm, is based on experiments in which the range of the numeric value in which distortion on the reflection surface 9 is not produced, was found out. In addition, the distance between the projection portion 50 and the back side end portion 14 of the reflection surface 9 means the shortest distance from the front side end portion 51 of the projection portion 50 to the back side end portion 14 of the reflection surface 9.

Next, the reason that the above-mentioned distance L is desirably 5 mm or less will be described below referring to FIGS. 1A, 3 and 5.

Figure 5:
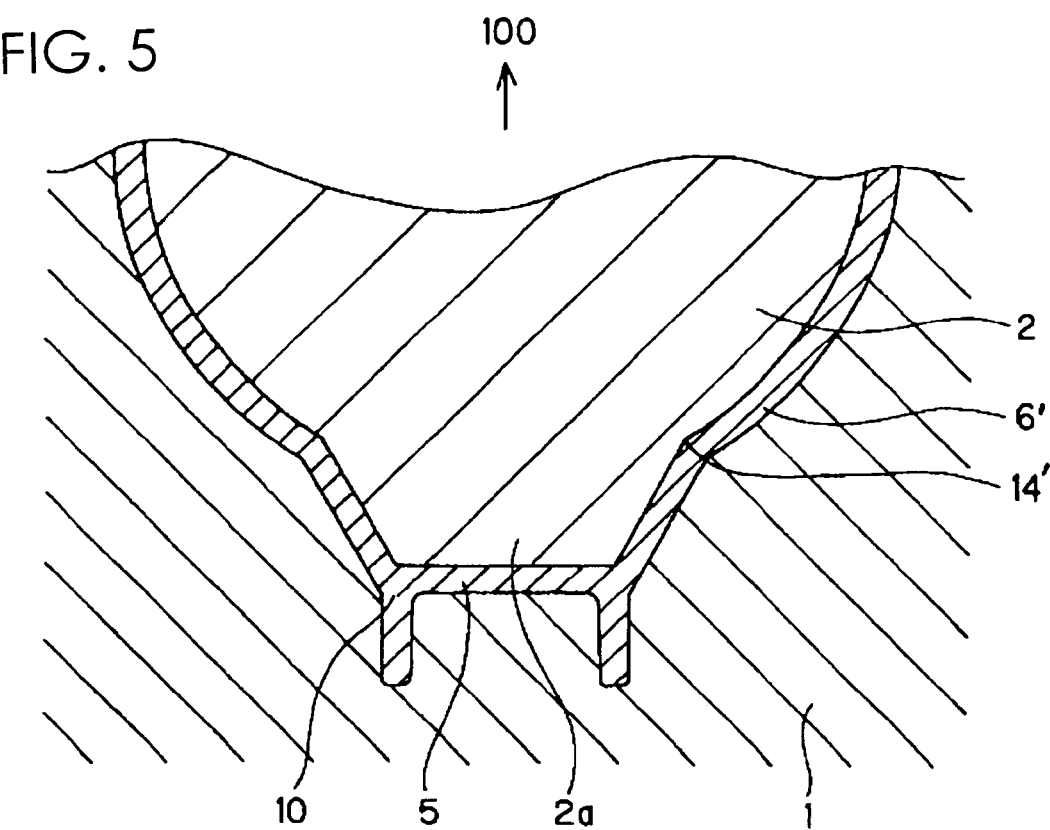
FIG. 5 is an enlarged view of tip part of the male mold 2 shown in FIG. 1A.

FIG. 5 is an enlarged view of tip part of the male mold 2 shown in FIG. 1A.

The structure of a tip portion 2a of the male mold 2 shown in FIG. 5 is designed to form the punch portion 5 astern of a portion 14' which will become the back side end portion 14 in the reflection surface 9. The indispensable condition is that the reflector has a taper shape in which a diameter thereof is widen towards the front side in the front direction 100 (in the front side direction for lifting the shaped reflector) so that it is possible to lift the shaped reflector 6' promptly after molding. In the figure, the taper shape is expressed exaggeratingly. In this case, in the reflector 6 which is used for the light source 20 shown in FIG. 3, the diameter of the back side opening portion 12 (the back side end portion of the reflection surface 9) is determined corresponding to the size of the lamp 30, so that light from the lamp 30 is reflected at a maximum. Therefore, in FIG. 5, if the tip portion 2a of the male mold 2 is designed to have a superfluously long structure, the diameter of the punch portion 5 becomes small inevitably, so that the diameter of the back side opening portion 12 for inserting the lamp, formed in the second process shown in FIG. 1B cannot but become small.

In this case, the diameter of the back side opening portion 12 for inserting the lamp needs to satisfy the following three requirements, which will be described below referring to FIG. 3.

First, since the mouthpiece 33 for electric supply is attached to one of the sealing portions 32 of the lamp 30, only the diameter through which this mouthpiece 33 passes is required.

Second, since it is necessary to carry out fine position adjustment in case that the lamp 30 is fixed to the reflector base 16 through the mouthpiece 33, the space for the position adjustment is required in addition to the diameter of the sealing portion 32.

Third, in case that the lamp 30 is built into the reflector 6 according to the present invention so as to use it as a light source apparatus 20, the optically transparent front glass plate 15 is inserted in the front side opening portion 11 in order to prevent fragments of the lamp 30 from scattering when the lamp 30 is exploded. And since it has a structure in which cooling air is introduced in the reflector 6 in order to cool down the inside of the light source apparatus 20, the cooling air needs to pass through it, without losing the cooling function.

Therefore, in the present invention, since the distance L between the projection portion 50 and the back side end portion 14 of the reflection surface 9 may be specified to from 2.5 mm to 5 mm (2.5 mm or more and 5.0 or less) when the reflector according to the present invention is used to a light source apparatus 20, in such a case, it is possible to form the back side opening portion 12 having the diameter which satisfies the above-mentioned three requirements. The above-mentioned three requirements are satisfied if the distance L is 2.5 to 5.0 mm). In addition, that is more desirable since distortion does not arise in the reflection surface 9 as mentioned above. The numeral value "5 mm or less" is obtained by the experiments, taking into consideration, the above-mentioned three requirements.

In addition, according to the present invention, it seems that the diameter of the back side opening portion 12 for inserting the lamp must be made small. However, in case that there is no problem if the surface area of the reflection surface 9 decreases, what is necessary is just to use, in the first process shown in FIG. 1A, the female mold 1 and the male mold 2 which are designed so that the diameter of the punch portion 5 of the shaped reflector 6' becomes large, taking into consideration the above-mentioned situation.

Furthermore, in the present invention, the thickness of the projection portion 50 may be specified in the range of 1 mm to 2.5 mm. In this case, since the thickness of the punch portion 5 is specified so that the back side opening portion 12 for inserting the lamp is easily formed by the depressing member 7 in the second process shown in FIG. 1B, the back side opening portion 12 can be formed easily. Furthermore, an effect as shown in FIG. 6 is also acquired.

Figure 6:
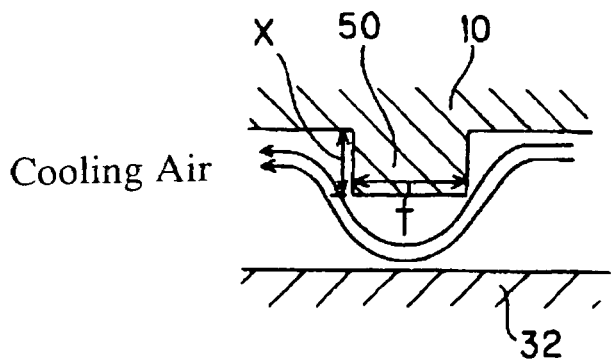
FIG. 6 is an enlarged view of a dotted line portion B shown in FIG. 3.
Figure 7A:
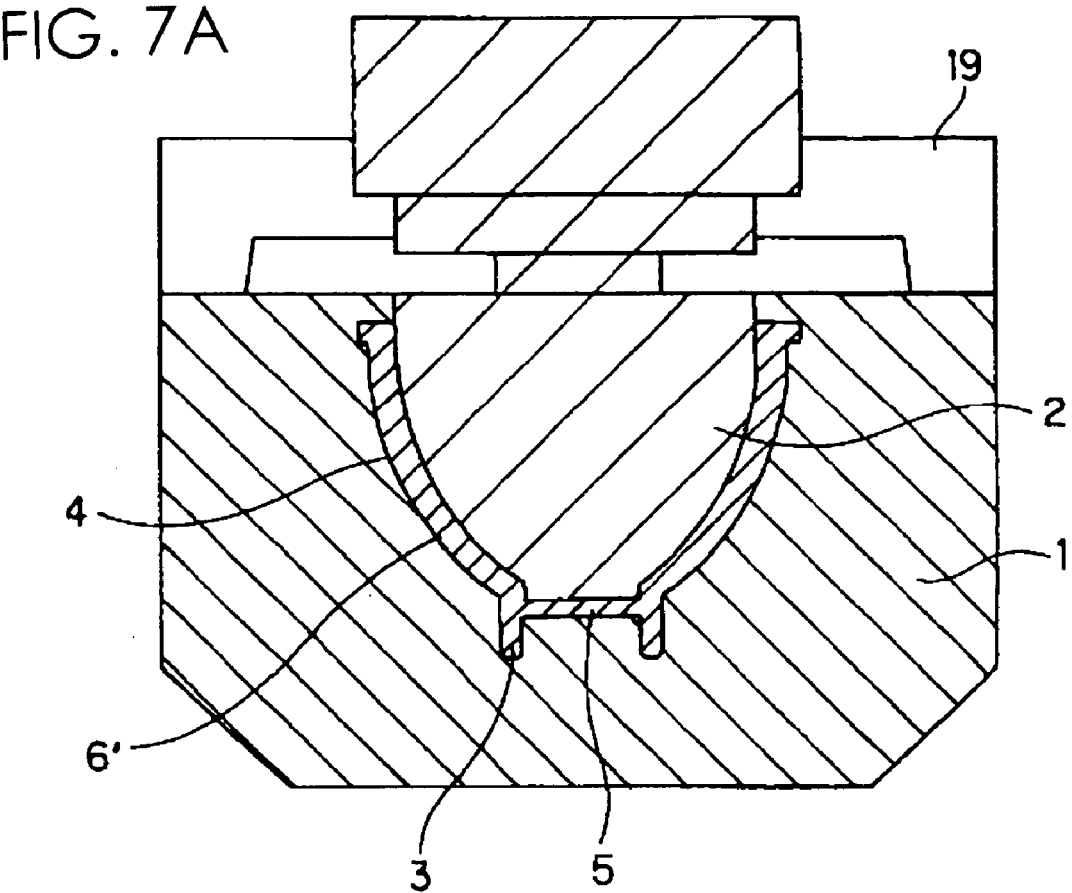
FIGS. 7A and 7B are diagrams for explaining the manufacture method of the reflector for the conventional extra-high pressure mercury lamps.
Figure 7B:
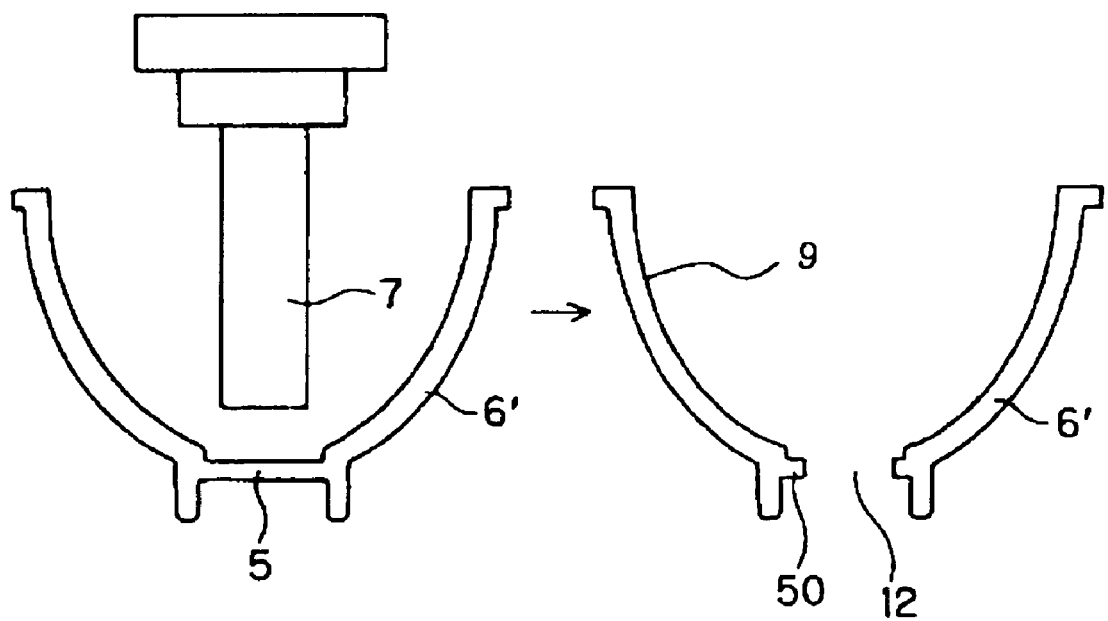

FIG. 6 is an enlarged view of a dotted line portion B shown in FIG. 3.

As shown in FIG. 6, since the flow of the cooling air shown in the arrows in FIG. 3 flows in whirls around the projection portion 50, it becomes possible to cool the sealing portion of the lamp evenly and uniformly. In the figure, the thickness of the projection portion 50 is shown by a letter "T," and the projection portion 50 is shown with exaggeration. Furthermore, in order to fully acquire the above-mentioned cooling effect, it is desirable that the length X of the projection portion 50 is 0.3 mm-1.0 mm.

On the other hand, it is difficult to form the back side opening portion 12 for inserting the lamp by the depressing member 7 in the second process shown in FIG. 1B if thickness thereof exceeds 2.5 mm. Specifically, since the thickness of the punch portion 5 is too large, many cracks are created in the surface of the projection portion 50, so that in the third process it will take a long time to eliminate these cracks, or in the worst case, there is also a possibility of damaging the neck portion 10. The cooling effect shown in FIG. 6 cannot be fully acquired if the thickness thereof is less than 1 mm.

The numerical example of the reflector according to the present invention is given to below. Of course, the numerical values are an example and is not limited thereto.

| | |
|---|---|
| Diameter of the front side opening: | 55 mm |
| Diameter of the back side opening portion: | 11.2 mm |
| Diameter of the projection portion: | 9.7 mm |
| Thickness: | 4.0 mm |
| Full length of the reflector: | 45.6 mm |
| Full length of the neck portion: | 6.5 mm |

In addition, although the reflector according to the present invention has been explained as used for an extra-high pressure lamp which is a light source of a liquid crystal projector, the present invention is not limited thereto, and can be applied to other lamps, for example, a metal halide lamp etc.

Moreover, the light source apparatus according to the present invention is not limited to the structure in which the front glass plate is fitted in the front side opening portion of the reflector, and the light source apparatus may have the structure in which there is no front glass plate fitted in the front side opening portion.

Furthermore, the present invention is not necessarily limited to the structure in which the cooling air flows in order to cool down the lamp, and it is also possible to adopt the structure in which cooling air does not flow.

Although the present invention is explained referring to the embodiments, the present invention is not limited to the above-mentioned embodiments but it is possible to change the structure. Further, the present invention possesses a number of advantages or purposes, and there is no requirement that every claim directed to that invention be limited to encompass all of them.

The disclosure of Japanese Patent Application No. 2003-368884 filed on Oct. 29, 2003 including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A bowl-shaped reflector made of borosilicate glass, having a front side opening portion, a back side opening portion and a reflection surface that reflects light emitted from a lamp, the reflector comprising:
   a neck portion which has a non-reflection surface area formed in contact with a back side end portion of the neck portion, therein; and
   an annular projection portion, wherein, the annular projection portion is formed on the non-reflection surface area at a 2.5 mm or more distance from a back side end portion of the reflection surface toward the back side end portion of the neck portion.

2. The reflector according to claim 1, wherein the annular projection portion is formed in an area at 5 mm or less distance from the back side end portion of the reflector surface toward the back side end portion of the neck portion.

3. The reflector according to claim 1, wherein thickness of the annular projection portion is 1 to 2.5 mm.

4. The reflector according to claim 2, wherein thickness of the annular projection portion is 1 to 2.5 mm.

5. A light source apparatus, wherein an extra high pressure mercury lamp is provided in the reflector according to claim 1.

6. A reflector, comprising:
   a front side opening portion,
   a back side opening portion,
   a reflection surface,
   a neck portion which has a non-reflection surface area formed in contact with a back side end portion of the neck portion, therein; and
   a projection portion formed on the non-reflection surface area at a 2.5 mm or more distance from a back side end portion of the reflection surface toward the back side end portion of the neck portion.

* * * * *